May 11, 1954   J. L. SEARLE   2,678,209
LUBRICATING STRUCTURE FOR LEAF SPRINGS
Filed May 29, 1950

INVENTOR.
JOHN L. SEARLE
BY Whittemore,
Hulbert & Belknap
ATTORNEYS

Patented May 11, 1954

2,678,209

UNITED STATES PATENT OFFICE 2,678,209

LUBRICATING STRUCTURE FOR LEAF SPRINGS

John L. Searle, Detroit, Mich., assignor to Detroit Steel Products Company, Detroit, Mich., a corporation of Michigan Application May 29, 1950, Serial No. 164,971

2 Claims. (Cl. 267—50)

The present invention relates to lubricating structure for leaf springs and more particularly, leaf springs of the type used in automotive vehicles.

It is an object of the present invention to provide a positive simple lubricating structure for introducing lubricant between the contacting surfaces of leaf springs, particularly the areas thereof adjacent the ends of the leaf springs.

It is a further object of the present invention to provide grease fittings for applying lubricant under pressure to leaf springs.

It is a further object of the present invention to provide a leaf spring construction including means providing a reservoir intermediate adjacent leaf springs and adjacent the end thereof.

It is a further object of the present invention to provide a grease fitting in combination with means for securing the grease fitting to a leaf spring in a manner to form a grease receiving reservoir between such leaf spring and the next adjacent leaf spring of an assembly.

It is a further object of the present invention to provide a grease fitting applied to an opening in a leaf spring which is removable and replaceable after the leaf spring has been assembled with others.

More specifically, it is an object of the present invention to provide improved means for attaching a grease fitting to an apertured leaf spring.

It is a further object of the present invention to provide lubricating structure for a leaf spring assembly which comprises an enlarged opening through one leaf spring closed or substantially closed at one end by the next adjacent leaf spring, a plate of readily machinable material welded over the other end of said opening, the plate having a threaded opening of reduced size therein, and a lubricant fitting threaded into said threaded opening.

Other objects and features of the invention will become apparent as the description proceeds, especially when taken in conjunction with the accompanying drawings, wherein.

Figure 1:
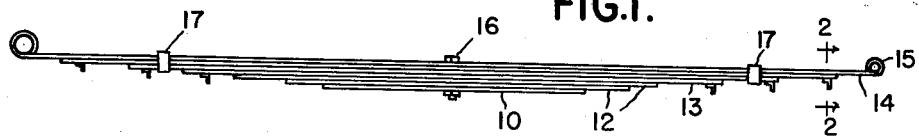
Figure 1 is a front elevation of a leaf spring assembly constructed in accordance with the present invention.

Referring now to the drawings, a spring assembly of the type referred to is illustrated in Figure 1 and is composed of a plurality of leaves running from a short central leaf 10 through the progressively longer leaves 11, 12, 13, etc., to the upper leaf 14 which is longest of the set and which is provided at each end with eyes 15 for attachment to the shackles of the vehicle frame. The assembly of leaves is provided with a center bolt 16 which holds the leaves together before installation and serves as a locating dowel after installation. Clips 17 are used adjacent the ends of some of the leaves to hold them in alignment and prevent them from spreading.

When the spring assembly is installed on a vehicle it assumes an approximate straight condition under load as illustrated in Figure 1. In the operation of the vehicle the spring flexes up and down with a resultant relative movement between adjacent leaves longitudinally thereof. This relative motion is at a minimum or is zero at the center bolt and is a maximum for each leaf adjacent its ends. Accordingly, the maximum frictional resistance of the contacting rubbing surfaces occurs at the areas adjacent the leaf ends, causing wear and in some cases objectionable squeaking noises.

It has long been recognized that lubrication between rubbing surfaces adjacent the ends of leaf springs is desirable. It has been suggested in the past to provide grease fittings for introducing grease into the spring assembly and to provide interconnecting holes adjacent leaf sections to allow the lubricant to circulate to the several contacting surfaces. This method has proved impractical however, since under service conditions satisfactory lubrication of all of the surfaces is not obtained. It has also been suggested to provide oil impregnated liners or inserts between spring sections and to provide metal spring covers. Many of the previously suggested devices for obtaining this result are not acceptable because they add excessively to the cost of the spring assembly. Others are not acceptable because they fail to provide positive lubrication at the critical areas.

According to the present invention a separate grease fitting is provided adjacent the end of each leaf spring where lubrication is essential. While in theory it is desirable to provide a single fitting for introducing lubricant to a plurality of leaf spring zone ends, practical experience has indicated that this result cannot be obtained.

Accordingly, a separate grease fitting is applied to the end of each leaf spring which it is desired to lubricate. Moreover, by providing grease fittings of the pressure type the possibility that lubrication will be overlooked during periodic lubrication of the vehicle is minimized. The several fittings illustrated in the drawings have the common feature that each allows direct lubrication of the areas at the ends of the leaves at a minimum of cost. The nipple of the fitting is made for use with a standard service station grease gun. The specific structural arrangement by which the grease fittings are applied to the leaves of the spring results in the formation of a reservoir in which a substantial quantity of lubricant is retained and from which reservoir such lubricant may move during use in order to keep the leaf spring assembly lubricated in the most efficient manner.

It is desirable to provide grease fittings which are removable and replaceable. These fittings are subject to damage in use, and even though protected in one of the embodiments illustrated herein, may require periodic replacement. In accordance with the present invention grease fittings 20 are employed having threaded portions 22 and annular shoulders 24 to serve as a stop when the fitting is threaded in place. The spring steel from which the leaf springs are constructed is very difficult to machine and to provide threaded openings directly in a leaf spring is not a practical operation. In accordance with the present invention the grease fitting is mounted in a plate 26 formed of a readily machinable steel and the plate 26 is permanently welded in overlying relation to a laterally enlarged opening 28 provided in the leaf spring which in this instance is designated 30.

By this construction the necessity of machining the spring steel of the leaf spring 30 is avoided by the addition of the readily machinable steel plate 26. In order to mount the lubricant fitting 20 in the plate 26 the plate 26 is provided with a threaded opening 32. In order to seal the connection a sealing gasket 34 may be employed.

Figure 2:
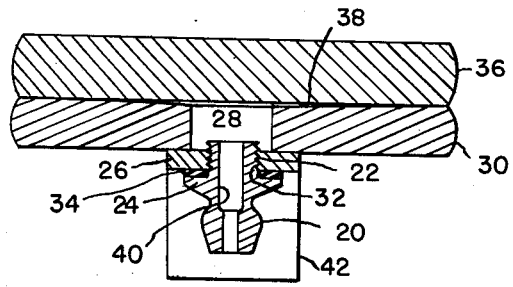
Figure 2 is an enlarged section on the line 2—2, Figure 1.

The opening 28 throough the spring 30 provides a relatively large grease reservoir closed at its top by the next adjacent spring 36 and closed at its bottom by the assembly of the plate 26 and the lubricant fitting 20. In Figure 2 the lubricant reservoir is illustrated as in communication with an additional space 38 resulting from relative camber or transverse curvature between the leaf springs 30 and 36.

If desired, the grease fitting 20 may be a pressure type fitting including a suitable valve located in the lubricant passage 40 which extends therethrough. Since grease fittings of this type are well known no effort is made to illustrate this familiar detail of construction.

Figure 3:
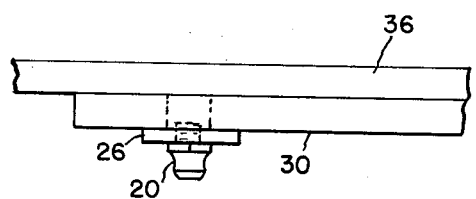
Figure 3 is a fragmentary side elevation of a leaf spring employing a modified form of the present invention.
Figure 4:
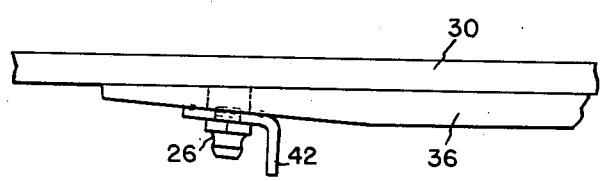
Figure 4 is a side elevation of a leaf spring construction of the type illustrated in section in Figure 2.
Figure 5:
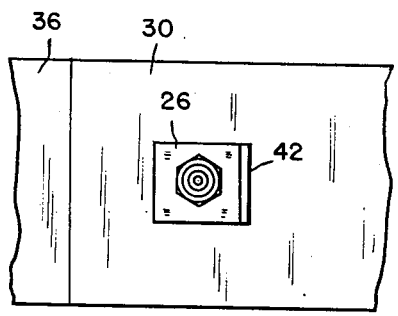
Figure 5 is a bottom plan view of the spring construction illustrated in Figure 4.

In order to protect the grease fitting from the hazards of use, the plate 26, as best seen in Figure 4, preferably includes an angularly bent portion 42 which extends alongside the fitting 20 and which therefore constitutes a guard for the fitting. While this construction is desirable it is not essential and in Figure 3 the plate 26 is illustrated without having the laterally extending portion to constitute a guard for the fitting 20.

The plate 26 as previously stated is secured to the leaf spring 30 in position overlying the opening 28 therein by welding. This welding operation is most effectively carried out as a projection welding operation in which the plate 26 is initially provided with shallow extensions which define limited area contact with the surface of the spring 30 before the welding operation takes place. As welding current is applied it is concentrated to the zone of contact between the welding projections and the leaf spring 30, and during the heating operation pressure is applied so that in the finished article the welds have completely or substantially completely disappeared. Thus the plate 26 is welded in sealing relation over the opening 28 through the spring 30.

While the grease fitting is herein illustrated as threaded in the opening in the plate 26, equivalent connecting means such as a bayonet connection or the like may of course be employed.

An important feature of novelty in the present case is the use of a readily machinable mounting plate welded to the spring steel leaf spring in position overlying the opening in the spring, thus providing a part for mounting the fitting which may be readily machined to provide the detachable connection for the fitting.

The drawings and the foregoing specification constitute a description of the improved lubricating structure for leaf springs in such full, clear, concise and exact terms as to enable any person skilled in the art to practice the invention, the scope of which is indicated by the appended claims.

What I claim as my invention is:

1. A lubricated leaf spring construction comprising a main leaf having an upper tension side and a lower compression side; said main leaf being devoid of any lubricating openings therethrough, a plurality of progressively shorter leaves beneath said main leaf with the upper tension sides of said shorter leaves in contact with the lower compression sides of the next higher leaves, the shorter leaf next adjacent said main leaf having laterally enlarged openings therethrough located outwardly beyond the ends of the next lower leaf, the upper side of said openings being closed by the lower compression side of said main leaf, readily machinable metal plates welded to the lower compression side of the shorter leaf next adjacent said main leaf to cover said openings and to form therewith and with the lower side of said main leaf laterally enlarged lubricant reservoirs, said plates having openings therethrough, lubricant fittings releasably retained in said plate openings, the adjacent surfaces of said main leaf and the next adjacent shorter leaf being relatively cambered to form lubricant receiving passages extending longitudinally thereof and in communication with said reservoirs.

2. A leaf spring construction as defined in claim 1 in which said plates have angularly bent flanges extending alongside said fittings and forming guards therefor.

References Cited in the file of this patent

UNITED STATES PATENTS

| Number | Name | Date |
|---|---|---|
| 1,371,003 | Simmons | Mar. 8, 1921 |
| 1,421,551 | Phillips | July 4, 1922 |
| 1,440,928 | Moore | Jan. 2, 1923 |
| 1,849,186 | Grau et al. | Mar. 15, 1932 |
| 2,067,831 | Dougherty | Jan. 12, 1937 |

FOREIGN PATENTS

| Number | Country | Date |
|---|---|---|
| 585,761 | France | Dec. 17, 1924 |
| 397,985 | Germany | July 4, 1924 |